US006748740B2

(12) United States Patent
Fan

(10) Patent No.: US 6,748,740 B2
(45) Date of Patent: Jun. 15, 2004

(54) MULTILEVEL SPEED REGULATION JACK AND METHOD OF OPERATION

(76) Inventor: Qun Fan, No. 15, Qiaolian Lane, Nongfengliqun Road, Gaomi, Shandong (CN), 261500

( * ) Notice: Subject to any disclaimer, the term of this patent is extended or adjusted under 35 U.S.C. 154(b) by 21 days.

(21) Appl. No.: 10/253,964

(22) Filed: Sep. 24, 2002

(65) Prior Publication Data

US 2003/0056508 A1 Mar. 27, 2003

(30) Foreign Application Priority Data

Sep. 24, 2001 (CN) ........................................ 01141931 A

(51) Int. Cl.[7] ............................................... F16D 31/02
(52) U.S. Cl. ......................................................... 60/479
(58) Field of Search ........................................... 60/479

(56) References Cited

U.S. PATENT DOCUMENTS 5,755,099 A 5/1998 Hung
6,199,379 B1 3/2001 Hung

FOREIGN PATENT DOCUMENTS

CN 99209440.2 5/2000 ............. B66F/3/24

*Primary Examiner*—Edward K. Look
*Assistant Examiner*—Michael Leslie
(74) *Attorney, Agent, or Firm*—Houston Eliseeva LLP

(57) ABSTRACT

A multilevel speed regulation method for a jack and a multilevel speed regulation jack use a hydraulic speed regulation line which includes at least two parallel hydraulic sub-lines extending between the input and output cylinders and the pressure applied by the output cylinder against the load is taken as the control signal to control the opening and closure of the hydraulic sub-lines or their combination at different speed levels. Application of the method in this invention provides the jack with the capability to automatically transfer between different speed levels in the case of different loads, and thus the lifting efficiency is improved. Additionally, this invention also provides a multilevel speed regulation jack, in which a hydraulic speed regulation line of at least three speed levels is connected in series between the input and output cylinders. This hydraulic speed regulation line consists of at least two parallel hydraulic sub-lines. The jack in this invention is capable of transferring between different lifting speeds, and thus the lifting efficiency of the jack is enhanced.

23 Claims, 9 Drawing Sheets

MULTILEVEL SPEED REGULATION JACK AND METHOD OF OPERATION

BACKGROUND OF THE INVENTION

A jack is one of the commonly used tools in our daily life. It is typically used to lift a load a preset lift distance with smaller forces than that required to lift it directly. Its input piston, which has a small surface area to move with a small force, pushes the hydraulic oil into the output cylinder, thus driving the output piston, which has a larger surface area to lift the load. In accordance with the Law of Conservation of Energy, the input piston travels a much larger distance than the output piston does. As a result, it is typically necessary to pump the input piston repeatedly. In this process, each pump cycle of the input piston results in the same lift distance of the load, being independent of the magnitude of the load. As a result, in the case of an idle, or no, load, light load, or heavy load, it is necessary to pump the input piston repeatedly. The load goes up very slowly even if the load is small. This wastes both time and effort.

To solve the above-identified problem, a hydraulic jack described in Chinese Pat. No. 99209440.2 adopts a double-jacket piston structure—a smaller piston is located within a larger one of the input cylinder. There are two pressurized surfaces in the input cylinder. In the case of an idle load, the jack uses its larger piston to pump oil to increase the quantity of hydraulic oil pumped into the output cylinder, thus making the lift distance for each pumping cycle larger and thus increasing the overall lifting speed. In the case of a heavy load, the jack then uses its smaller piston, which is equivalent to a piston of a conventional jack. This configuration can therefore yield a saving of effort relative to a conventional jack.

Although the double-jacket piston structure solves the problem of wasted time and effort in the case of an idle load, a problem can arise during the process of changing from a small to a large load, when it is used to lift a light load. Besides, if this kind of jack is used to lift a small weight, it still needs the same number of pumping cycles as when it is used to lift a heavy weight, and the problem of wasted time still remains. Moreover, since it adopts a structure with a smaller piston in a larger one, the manufacture process and structural strength are limited, thus the area ratio of the pressurized surface in the case of an idle load and a heavy load is relatively small. As a result, there is little improvement in lifting speed in the case of an idle load. Practical application indicates that this jack still needs many pumping cycles to reach the necessary height; its efficiency is thus not high.

There is another type of hydraulic jack, which opens a blind hole in the middle of the piston of its output cylinder. An oil pipe is inserted into the blind hole. In the case of an idle load, when the piston of the input cylinder is pressed, the hydraulic oil flows into the blind hole via this oil pipe to push the piston for a rapid lift against the end face of the blind hole. In the case of a heavy load, part of the hydraulic oil opens a sequential valve and flows into the output cylinder. The force applied against the ring type surface of the piston of the output cylinder by the oil which flows into the output cylinder together with that applied against the end face of the blind hole by the oil which flows into the blind hole, jointly lift the load at a slow speed. Since the blind hole has a small area to receive force, the lift speed of the jack is very fast in the case of an idle load. Generally, the piston of the output cylinder can reach the height with only one or two pump cycles or strokes. On the other hand, in the case of a heavy load, since the whole end face of the piston of the output cylinder is taken as the area to receive force, the purpose of saving effort is also achieved.

However, it is found from practical application of this type of hydraulic jack that it cannot meet the requirements as expected above. The reason is that when the hydraulic oil is pressed into the output cylinder via the oil pipe, the piston of the output cylinder goes up rapidly; the pressure in the ring type cavity of the output cylinder goes down swiftly to suck hydraulic oil from the oil tank. However, since the piston moves relatively fast and the area of the ring type cavity changes very much, the sucked hydraulic oil cannot fully fill up the ring type cavity, resulting in a phenomenon of inefficient oil suction. Since there exists some air in the ring type cavity of the output cylinder, when the output cylinder starts to lift load, the load applies forces to the piston and makes the piston fall back a certain distance, thus reducing the speed of lift of the load. Moreover, after repeated pump cycles, the air held in the ring type cavity of the output cylinder flows into the input cylinder via the oil path, bringing about the same phenomenon of inefficient oil suction for the input cylinder; this reduces the lift distance for each pump cycle, and moreover the lifting efficiency. Additionally, this type of jack has also another disadvantage. Since the lifting force comes from the joint effort of the hydraulic oil flowing into the blind hole via the oil pipe and that flowing into the ring type cavity of the output cylinder via the one-way valve, the area of the blind hole and that of the ring type cavity changes at each pump press, it is necessary to ensure a balance between the pressures from the hydraulic oil flowing into the ring type cavity and that flowing into the blind hole to achieve a steady movement of the output piston. Unfortunately, it is very difficult to accomplish such a result in practical batch production process. As a result, when the controlled hydraulic oil enters the ring type cavity and is locked there, cracks of the thin-wall oil pipe can occur often owing to a large pressure in the blind hole. This results in low rate of finished products for this type of jack and thus increases its production cost.

SUMMARY OF THE INVENTION

It is an object of the present invention to provide a multilevel speed regulation method for a jack, which enables the jack to transfer between different lift speed levels in the case of different loads and avoid the phenomenon of time waste in the case of an idle load and a light load, so that the objectives of saving both time and effort and increasing lifting efficiency are achieved.

It is also an object of the present invention to provide a multilevel speed regulation jack, which can transfer between different lift speeds in the case of different loads, so that the lifting efficiency of the jack is enhanced.

The purposes of the present invention are achieved by using the following technical arrangement. In the multilevel speed regulation method and system for a jack, a hydraulic speed regulation line is arranged between the input and output cylinders, which includes at least two parallel hydraulic sub-lines to form a hydraulic speed regulation line with at least three speed levels. It takes the pressure applied by the output cylinder against the load as its control signal to control the opening and closure of the hydraulic sub-lines and their combination at different speed levels in the hydraulic speed regulation line.

The hydraulic speed regulation line comprises, in one implementation, three or more than three parallel hydraulic sub-lines, and, with one hydraulic sub-line added, two speed levels are added accordingly. A control valve is set in the hydraulic sub-lines to control the opening and closure through the control signal taken from the load pressure. The opening pressure of the hydraulic sub-lines is set in sequence and opens with the increase of the load.

In general, according to another aspect, the invention features a multilevel speed regulation jack, which includes at least one input cylinder and one output cylinder, and one oil path interconnecting the input cylinder and output cylinder, wherein there is a hydraulic speed regulation line connected in series between the input and output cylinders that provides at least three speed levels. This hydraulic speed regulation line comprises at least two parallel hydraulic sub-lines and takes the load pressure of the output cylinder as its control signal to control the opening and closure of the hydraulic sub-lines or their combination at different speed levels.

In one embodiment, the hydraulic speed regulation line comprises three or more parallel hydraulic sub-lines. Control valves are set in the hydraulic sub-lines to control the opening and closure through the control signal taken from the load pressure. The opening pressure of the hydraulic sub-lines is set in sequence and opens with increases of the load. The control valve set in the hydraulic sub-lines can be either a one-way valve or a sequential valve.

The operating process and principle of the present invention is: in case of an idle load or a very light load, when the piston of the input cylinder is pressed, the hydraulic oil is pumped to the input cavity of the speed regulation cylinder in the hydraulic sub-lines at a high speed level to push its piston to press the hydraulic oil in the output cylinder, and with the opening of the control valve, the hydraulic oil flows into the output cylinder and then pushes the piston of the output cylinder to lift the load rapidly at the first speed $V_1$. When the piston in this input cylinder is raised, the piston in the speed regulation cylinder returns to its original position under the forces from the flexible restoring mechanism, and meanwhile, the output cavity connected to the oil storage cylinder sucks oil and fills up the output cylinder. When the piston in the input cylinder is pressed once again, then the above process repeats. In this process, since the end face of the piston in the input cavity of the speed regulation cylinder is smaller than that of the piston in the output cylinder, the lift distance to lift the load each time is increased and also the lifting speed enhanced. With the increase in load against the output cylinder, and when the pressure of the input oil becomes larger enough to open the control valve in the next hydraulic sub-line, this control valve opens. Part of the hydraulic oil now pushes the piston of the speed regulation cylinder at the next speed level, and delivers the hydraulic oil in the output cavity of the speed regulation cylinder at the next level to the output cylinder, and thus pushing the piston to lift load at the second speed $V_2$. Since the difference between the areas of the input cavity and output cavity of the speed regulation cylinder at the next level is less than that of the high-speed hydraulic sub-line, then the lift speed $V_1$ is less than $V_2$. As a result, in accordance with the Law of Conservation of Energy, the capacity to lift load increases for the same input pressure. With the increase of load, the back pressure thus produced closes the control valve in the high-speed hydraulic sub-line, and the hydraulic oil pumped by the input cylinder is fully applied to the speed regulation cylinder at the next level to drive the piston to deliver the hydraulic oil in the output cavity to the output cylinder, thus the piston in the output cylinder lifts load at the third speed $V_3$. As above, the third speed $V_3$ is less than the second speed $V_2$. However, the lifting capacity in this case increases further, being capable to lift the load in this stage. As the load increases, the control valve in the low-speed hydraulic sub-line opens. Now part of the hydraulic oil is pumped directly to the output cylinder via this hydraulic sub-line and forces the piston of the output cylinder to lift the load at the forth speed $V_4$. Still as above, the forth speed $V_4$ is less than the third speed $V_3$. However, the lifting capacity in this case increases still further, being capable enough to lift the heavier load in this stage. As the load increases still further, the sequential valve of the hydraulic sub-line at the next level closes under the force from the back pressure, the hydraulic oil pumped by the input cylinder is fully delivered to the output cylinder via the low-speed hydraulic sub-line and forces the piston of the output cylinder to lift load at the fifth speed $V_5$. Still as above, the fifth speed $V_5$ is less than the forth speed $V_4$. However, the lifting capacity in this case reaches its maximum value. In such a case, since the hydraulic oil delivered into the output cylinder is directly pumped from the input cylinder, its operational principle is the same as that of a conventional jack.

In the above operating process of this invention, the transfer between various lifting speeds is automatically done with the change of the load. With the same effort each time, a load is lifted that increases continuously by regulating the speed without a need for any additional operations. This invention enhances the lifting efficiency and features simple and fast operation, achieving the purposes of saving both time and effort. Besides, in the speed regulation process, except that the input cylinder absorbs oil as does a conventional jack when the low-speed hydraulic sub-line between the input cylinder and output cylinder of the last hydraulic sub-line opens, there is no oil added in the input cylinder at all other speed levels. It only takes the hydraulic oil as a medium of pressure transfer to transfer the pressure applied against the piston of the input cylinder. As a result, it does not involve the problem of inadequate absorption of oil in the input cylinder as occurs with the present technology. Furthermore, the absorption process of oil after the input cylinder directly pumps hydraulic oil into the output cylinder via the low-speed hydraulic sub-line does not exist; it can do as well as a conventional jack does. All of the above works to avoid the phenomenon of filling back during lifting and thus ensures the efficiency of the load lifting process.

According to one embodiment, an overload protection device is provided for this invention. When the load that the output cylinder is lifting exceeds the pressure that the jack can bear, the high-pressure oil in the input cylinder will open the overflow valve for pressure relief. The hydraulic oil flows back into the oil tank via the overflow valve, and therefore prevents damage to the jack.

In the jack in this invention, several more hydraulic speed regulation sub-lines can be connected in parallel to the hydraulic sub-lines connected to the input cylinder. With one hydraulic sub-line added, two speed levels are added accordingly, which makes the jack's speed adjustable at multi-levels during its operation. In terms of its design, different specifications of the jack can be worked out according the magnitude of the load so that in application, different jacks of different specifications can be selected, depending on the specific requirements. When it is used to lift relatively smaller loads, a jack with relatively fewer speed levels can be selected. On the other hand, when it is used to lift a relatively larger load, a jack with relatively more speed levels can be selected. Since the jack from the present invention demonstrates different lifting capacities when it is working at different speed levels, it is, in fact, equivalent to a conventional jack with the corresponding lifting capacity. The effect when it is working at different speed levels in parallel, it is equivalent to several jacks of different specifications working at different load ranges with the increase of the load when it is used to lift load. As a result, the present invention incorporates functions of several conventional jacks of different specifications into one jack, and automatically regulates its speed in correspondence with the load changes. It is simple and convenient in lifting operations with enhanced lifting efficiency and equipment utilization rate.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

First Embodiment

The multilevel speed regulation method for a jack presented in this invention incorporates a hydraulic speed regulation line connected in series between the input cylinder B1 and the output cylinder B4. This hydraulic speed regulation line is comprised of at least two hydraulic sub-lines connected in parallel to each other, which form a hydraulic speed regulation line with at least three speed levels, and takes the pressure P applied by the output cylinder B4 against the load as its control signal to control the opening and closure of the hydraulic sub-lines or their combination at different speed levels in the hydraulic speed regulation line.

The hydraulic speed regulation line in this invention can be made up of either two parallel hydraulic sub-lines or three or more parallel hydraulic sub-lines. Generally, with each hydraulic sub-line added, two speed levels are added accordingly.

Figure 1:
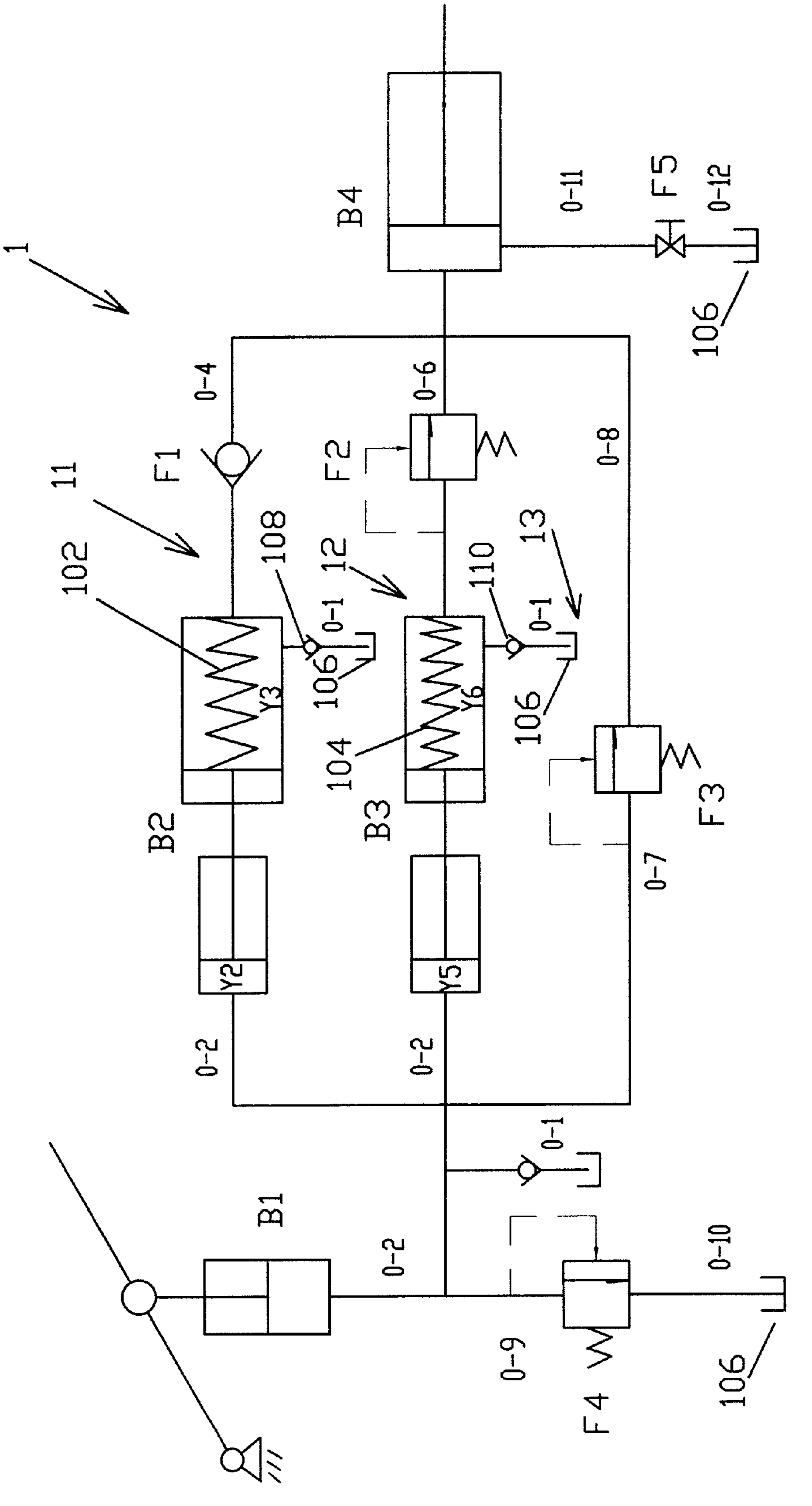
FIG. 1 is a schematic block diagram of a multilevel speed regulation jack according to a first embodiment of the present invention (Example 1)

In terms of its design, different specifications of the jack can be worked out according the magnitude of the load so that in application, different jacks of different specifications can be selected depending on the specific requirements. When it is used to lift relatively smaller loads, a jack with relatively fewer speed levels can be selected. On the other hand, when it is used to lift relatively larger loads, a jack with relatively more speed levels can be selected. As shown in FIG. 1, the hydraulic speed regulation line in this implementation example is comprised of three parallel hydraulic sub-lines 11, 12 and 13 and has five speed levels.

A control valve is set in the hydraulic sub-lines of this invention. This control valve takes the load pressure as its control signal to control its opening and closure. The opening pressure of the control valve in these hydraulic sub-lines can be set in sequence, and opens and closes with the increase of the load in sequence. In the case of an idle load or a light load, the control valve with the minimum opening pressure opens, and then, this high-speed hydraulic sub-line starts to work and push the piston in the output cylinder to lift load at the highest speed. When the load reaches a specific value, the control valve with a larger opening pressure than the above one opens, then this hydraulic sub-line next to the above one starts to work too, and forms with the high-speed hydraulic sub-line a hydraulic sub-line combination to jointly work against the output cylinder to lift load at the second speed. In case that the load increases to a still larger one, the control valve in this high-speed hydraulic sub-line closes under the force from the back pressure, and the next hydraulic sub-line works independently, and the output piston lifts load at the third speed. In short, several paralleled hydraulic sub-lines form the multilevel speed regulation jack by lifting the load at different speeds depending on the changes of the load.

As shown in FIG. 1, the hydraulic speed regulation line 1 in this implementation example is comprised of three hydraulic sub-lines 11, 12 and 13. Control valves F1, F2 and F3 are set respectively in each of these hydraulic sub-lines 11, 12 and 13. The sequence of opening pressure of these control valves is F1<F2<F3, and the opening and closure of these control valves are controlled by the load magnitude sequence so that the working sequence of the hydraulic sub-lines is controlled accordingly. In this implementation example, the hydraulic sub-line combination can be made up of hydraulic sub-lines adjacent to each other. As a result, the three hydraulic sub-lines 11, 12 and 13 and their hydraulic sub-line combinations provide the jack with five speed levels in this implementation example.

As shown in FIG. 1, the speed regulation cylinders B2 and B3 are set in the hydraulic sub-lines 11 and 12, and the area difference between the pistons of the input cavity Y2 and output cavity Y3 of the speed regulation cylinder B2 is larger than that between the pistons of the input cavity Y5 and output cavity Y6 of the speed regulation cylinder B3. The hydraulic sub-lines and the hydraulic sub-line combinations feature this jack with different speed levels by changing the area difference between pistons of the input cavity and output cavity of the speed regulation cylinder B2 and B3 in the hydraulic sub-lines 11 and 12.

Figure 2:
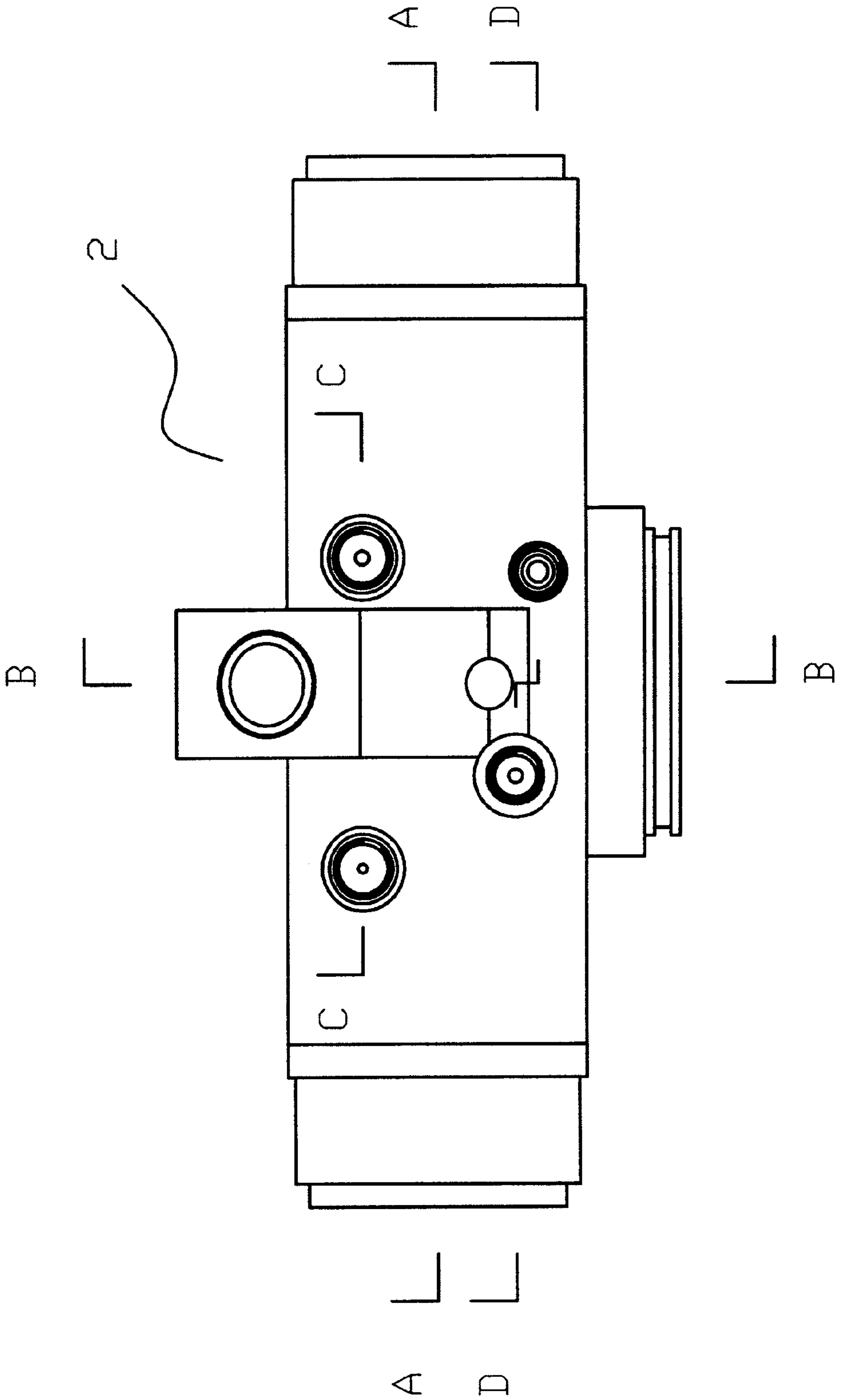
FIG. 2 is a plan view of the valve plate structure of the inventive jack.

As shown in FIG. 1 and 2 of this implementation example, by setting the areas between pistons of the input cavities Y2 and Y5 in the speed regulation cylinders B2 and B3 equal to each other, and meanwhile, the area of the piston of this output cavity Y3 larger than that of the output cavity Y6, a change to the area difference between pistons of the input and output cavities is accomplished, which makes the working speed of the hydraulic sub-line 11 faster than that of the hydraulic sub-line 12.

As shown in FIG. 1, the hydraulic sub-line 13 with the lowest speed level in the hydraulic speed regulation line can be directly connected to the input cylinder B1 and output cylinder B4 via the control valve F3. Since its speed is not regulated by a speed regulation cylinder, this hydraulic sub-line has the lowest working speed, being equivalent to the working status of a conventional jack. However, it has the largest lifting capacity, and thus enjoys the status of highest lifting capacity of this type of jack.

The speed regulation cylinder in this invention features a flexible restoring mechanism. The output cavity of this speed regulation cylinder is connected to the oil tank via a one-way valve. When there is no pressure input to this input cylinder B1, the flexible restoring mechanism can bring along the piston of the speed regulation cylinder to its original position. As a result, the volume of the output cavity becomes larger, and the hydraulic oil in the oil tank goes up and opens the one-way valve and adds into the output cavity.

As shown in FIG. 1 of this specific implementation example, the speed regulation cylinders B2 and B3 are both incorporated with a flexible restoring mechanism, which can be made from spring in practice. When the piston of the input cylinder B1 is pressed, the hydraulic oil forces the pistons of the speed regulation cylinders B2 and B3 to move and delivers the hydraulic oil in the output cavities to push the piston of the output cylinder B4 up, and meanwhile, compresses or extends the springs 102 and 104. When there is no pressure input to this input cylinder B1, this flexible restoring mechanism restores its free state, and brings along the piston of the speed regulation cylinder to its original position. As a result, the volume of the output cavity becomes larger, and the hydraulic oil in the oil tank 106 goes up and opens the one-way valves 108 and 110 and adds into the output cavity. This is ready for a next lift.

In this implementation example, the hydraulic speed regulation line 1 comprised of three hydraulic sub-lines 11, 12 and 13 features five speed levels, and its complete speed regulation process is as follows:

(1) In the case of an idle load, when the piston of the input cylinder B1 is pressed, the control valve F1 with the lowest opening pressure and at the highest speed level in the hydraulic sub-line 11 opens. The hydraulic oil is pumped to the input cavity Y2 of the speed regulation cylinder B2 to force the hydraulic oil in the output cavity Y3 to flow into the output cylinder B4 and push the piston of the output cylinder up rapidly at the first speed $V_1$. Upon completion of a lift, after the piston of the output cylinder B4 is raised, the piston in the speed regulation cylinder B2 returns to its original position under the forces from the flexible restoring mechanism, i.e., spring 102, and the hydraulic oil goes up and opens the one-way valve 108 and adds into the output cavity Y3 of the speed regulation cylinder B2. Then, after the piston of the input cylinder is pressed again, the above process repeats.

In this process, since the piston area of the output cavity Y3 in the speed regulation cylinder B2 is larger, so the one-time distance of lift by the piston in the output cylinder B4 is the largest each time, and therefore, it has the highest lifting speed. During its idle stage before load is applied, it reaches the load after only a few pump press cycles. This reduces the number of pumping cycles or strokes in the case of an idle load, and therefore, enhances its work efficiency.

(2) As the load increases, the control valve F2 in the next hydraulic sub-line 12 opens. Part of the hydraulic oil pumped by the input cylinder B1 is delivered to input cavity Y5 of the second speed regulation cylinder B3 and pushes its piston to force the hydraulic oil in the output cavity Y6 to be delivered into the output cylinder B4, and thus a combination of the hydraulic sub-line 11 with 12 is formed, and the piston of the output cylinder lifts load at the second speed $V_2$.

In such a case, since the area difference between pistons of the input cavity Y2 and the input cavity Y5 of the next speed regulation cylinder B3 is less than that of the high-speed speed regulation cylinder B3, the lift speed $V_2$ is less than $V_1$. However, in accordance with the Law of Conservation of Energy, its lifting capacity is enhanced under the same force from the input pressure side, being capable of lifting a larger load at this stage.

(3) As the load increases further, the back pressure thus produced forces the control valve F1 of the high-speed hydraulic sub-line to close, the hydraulic oil pumped by the input cylinder is fully delivered to the input cavity Y5 of the speed regulation cylinder B3 at the next level, which pushes its piston to force the hydraulic oil in the output cavity Y6 to be delivered into the output cylinder B4, and therefore, the piston of the output cylinder B4 lifts load at the third speed $V_3$.

Also, in such a case, the lift speed $V_3$ is less than $V_2$; however, the lifting capacity increases under the same force from the input pressure, being capable of lifting the load at this stage.

(4) In case that the load increases still further, the control valve F3 of the hydraulic sub-line 13 at the low-speed level opens, part of the hydraulic oil is pumped directly to the output cylinder B4 via the hydraulic sub-line 13 at the low speed level, and this hydraulic sub-line forms a combination with the hydraulic sub-line 12 and 11 as well, and works jointly to force the piston of the output cylinder B4 to lift the load at the forth speed $V_4$.

In such a case, the lift speed $V_4$ is less than $V_3$ according to the same principle of speed regulation as above; however, the lifting capacity increases still further, being capable of lifting the load at this stage.

(5) In case that the load exceeds a certain value, the back pressure thus produced forces the control valve F2 of the hydraulic sub-line 12 at the next level to close, the hydraulic oil pumped by the input cylinder B1 is fully delivered to the output cylinder B4 via the hydraulic sub-line 13 at the low-speed level, thus the output cylinder B4 lifts load at the fifth speed $V_5$.

According to the same principle as above, the lift speed $V_5$ is less than $V_4$. In such a case, it is equivalent to the working process of the conventional jack with the largest lifting capacity, and however the lowest lift speed.

The above speed regulation process is complete for this implementation example. However, in practice, to achieve the lifting purpose, only the speed regulation process described in (1) and (2) is used in the case of a light load according the changes of the load. Moreover, in the case of a relatively heavier load, the complete process described from (1) to (5) is used to achieve the lifting purpose. In addition, the pump cycles or strokes needed at each speed level has something to do with the speed of change of the load. It may need more strokes at the speed level at which the load changes slowly or remains unchanged at a constant value. On the other hand, one time of pump press may be enough to lift the load at this stage at the speed level with fast load change, and then, being changed to the next speed level. In the whole lifting process, the transfer between various lifting speeds is automatically done with the change of the load, and with the same effort each time, it can lift a load which increases continuously by regulating the speed without a need for any additional operations. This invention enhances the lifting efficiency and features simple and fast operation, achieving the purposes of saving both time and effort.

In the complete speed regulation process above, except that the input cylinder B1 absorbs oil as does a conventional jack when its piston is raised during the operation of the low-speed hydraulic sub-line, there is no oil added in the input cylinder B1 at all other speed levels. It only takes the hydraulic oil as a medium of pressure transfer to transfer the pressure applied against the piston of the input cylinder B1. As a result, it does not involve the problem of inadequate absorption of oil in the input cylinder B1 existing with the present technology. Furthermore, the absorption process of oil after the input cylinder B1 directly pumps hydraulic oil to the output cylinder via the low-speed hydraulic sub-line 13 does not create the problem of inadequate absorption of oil; it can do as well as a conventional jack does. All of the above works to avoid the phenomenon of filling back during lifting, and thus ensures the work efficiency of load lift.

Throughout all of the above five speed regulation processes, the lifting capacities at each of the speed levels are different. As a result, the jack when working at each of its speed levels is equivalent to an individual conventional jack with the corresponding lifting capacity. Therefore, the jack when working at all its five speed levels respectively with the increase of the load is equivalent to five individual conventional jacks of different specifications which are working in different load stages, and in this way, enhances its work efficiency. As a result, the present invention incorporates functions of several conventional jacks of different specifications into one jack, and automatically regulates its speed in correspondence with the load changes. It is simple and convenient in lifting operations with obviously enhanced lifting efficiency and equipment utilization rate.

Figure 3:
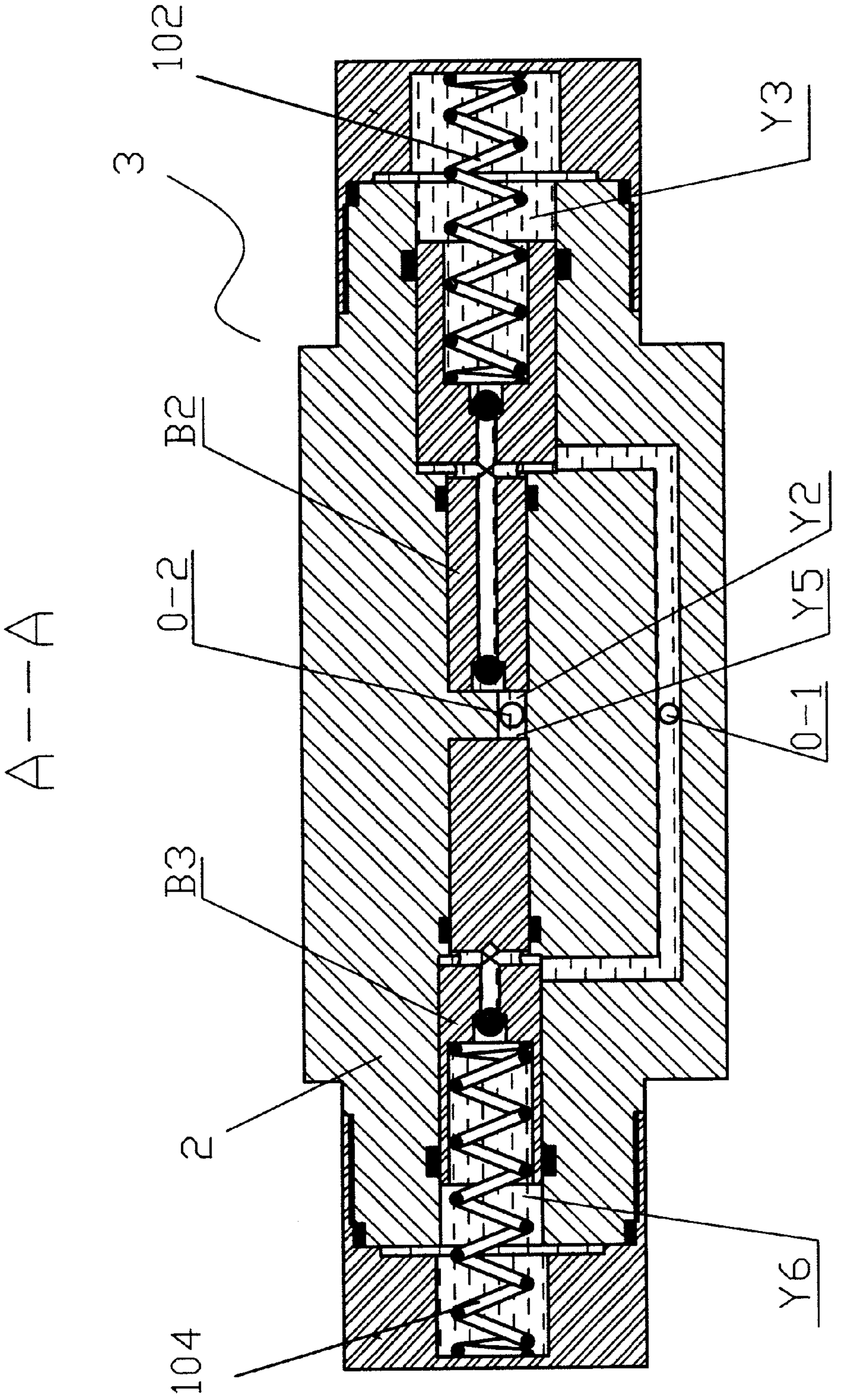
FIG. 3 is the A—A cutaway view of the valve bush combination in FIG. 2.
Figure 5:
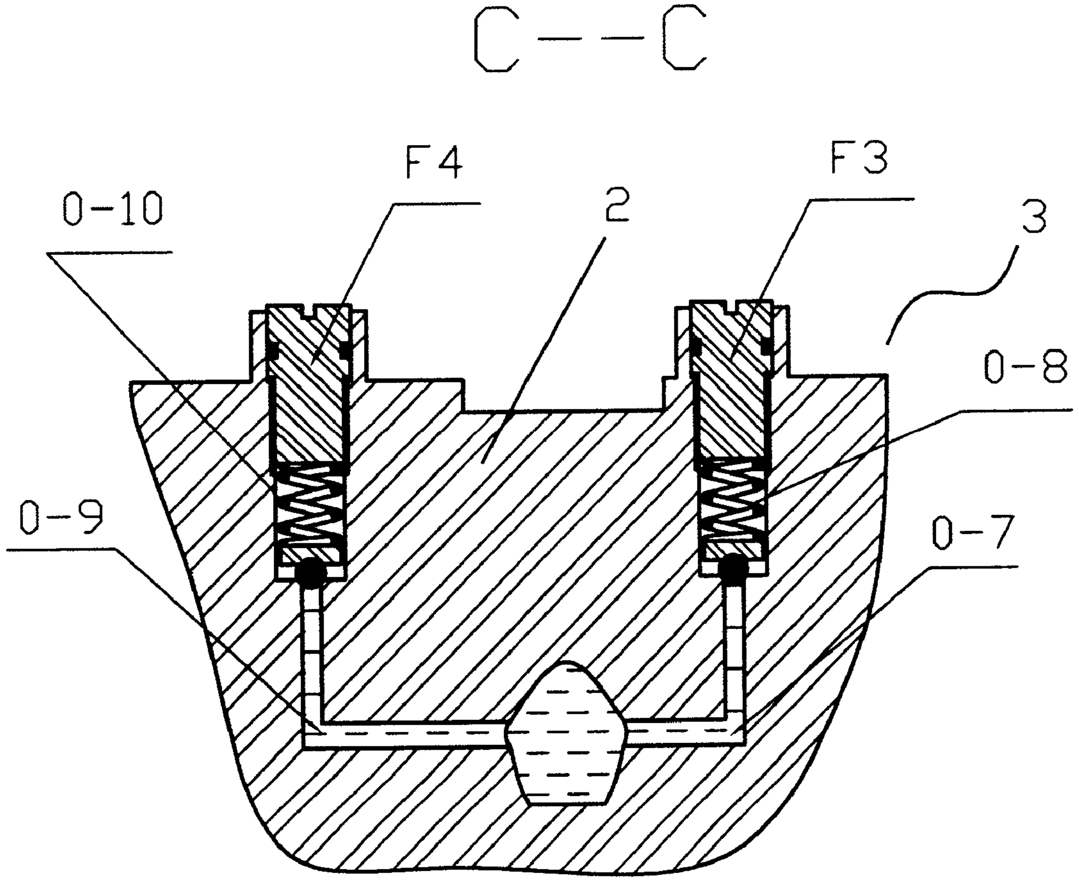
FIG. 5 is the C—C cutaway view of the valve bush combination in FIG. 2.
Figure 6:
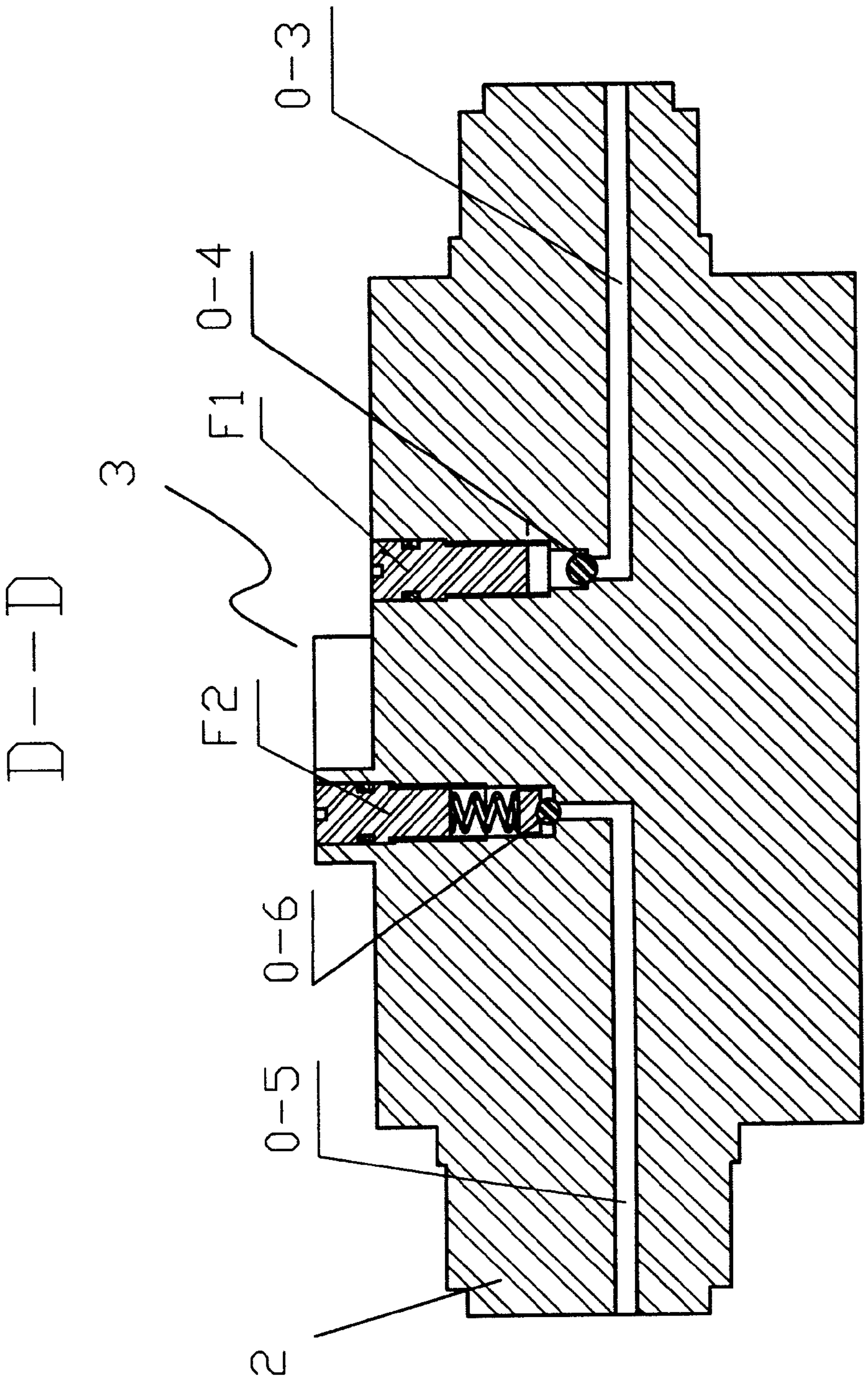
FIG. 6 is the D—D cutaway view of the valve bush combination in FIG. 2.

As shown in FIGS. 1, 5 and 6 of this implementation example, the control valves F1, F2, and F3 set in the hydraulic sub-lines can be either a one-way valve or a sequential valve. As shown in FIGS. 1 and 3, the speed regulation cylinders B2 and B3 can be made up of cylinders of two sizes with the piston sectional area of the first-level cylinder being larger than that of the second-level cylinder, and the first-level piston is connected to the second-level piston via a piston rod. When the piston of the input cylinder B1 is pressed, the hydraulic oil flows into the first-level cylinder of the speed regulation cylinder in the correspondingly opened hydraulic sub-line to force the piston of the first-level piston to move, and the pressure against the piston at this level is transferred to the piston at the second level via the piston rod, and further, the piston at the second level pushes the hydraulic oil in the output cavity of the speed regulation cylinder to flow into the output cylinder B4, thus making the piston of the output cylinder B4 lift the load.

As shown in FIG. 3, the springs 102 and 104 can be set in the output cavities Y3 and Y6 of the speed regulation cylinders B2 and B3 in practice, and these output cavities Y3 and Y6 are both connected to the oil tank via a one-way valve 0-1, see also reference numerals 108 and 110 of FIG. 1. When the piston of the input cylinder B1 is raised and the springs 102, 104 bring along the pistons of speed regulation cylinder B2 and B3 to their original positions, the areas of the output cavities Y3 and Y6 become larger and the pressure in them smaller, the hydraulic oil goes up and opens the one-way valves 108, 110 to add into the output cavities Y3 and Y6, being ready for the next lift.

Figure 4:
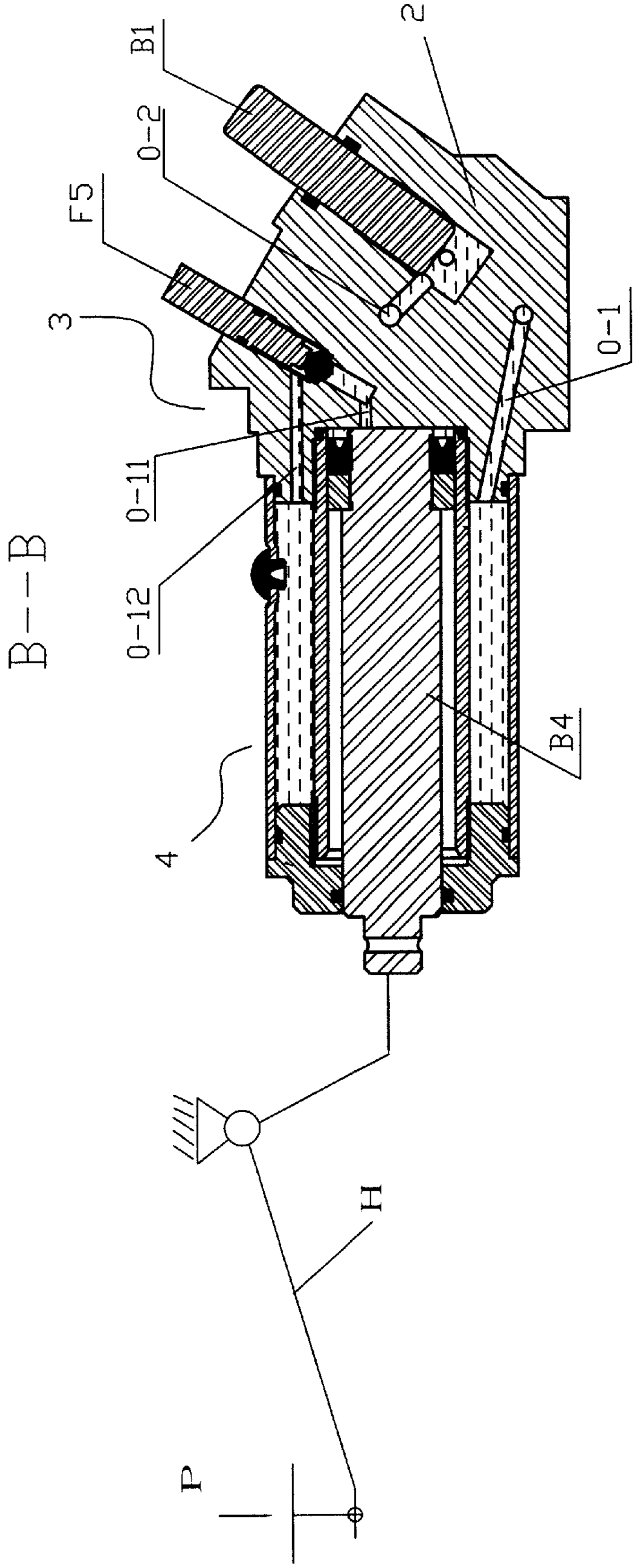
FIG. 4 is the B—B cutaway view of the valve bush combination in FIG. 2.

As shown in FIGS. 1 and 4 of this implementation example, an overload protection device is provided for this invention. The input cylinder B1 is connected to the oil tank 106 via an overflow valve F4. When the load, which the output cylinder B4 is going to lift, exceeds the pressure that the jack can bear, the high-pressure oil in the input cylinder B1 returns to the oil tank via the overflow valve F4; all this works to prevent damage to the jack.

As shown in FIG. 4 of this implementation example, the external load P is applied to the piston of the output cylinder B4 via the lifting arm H.

Figure 7:
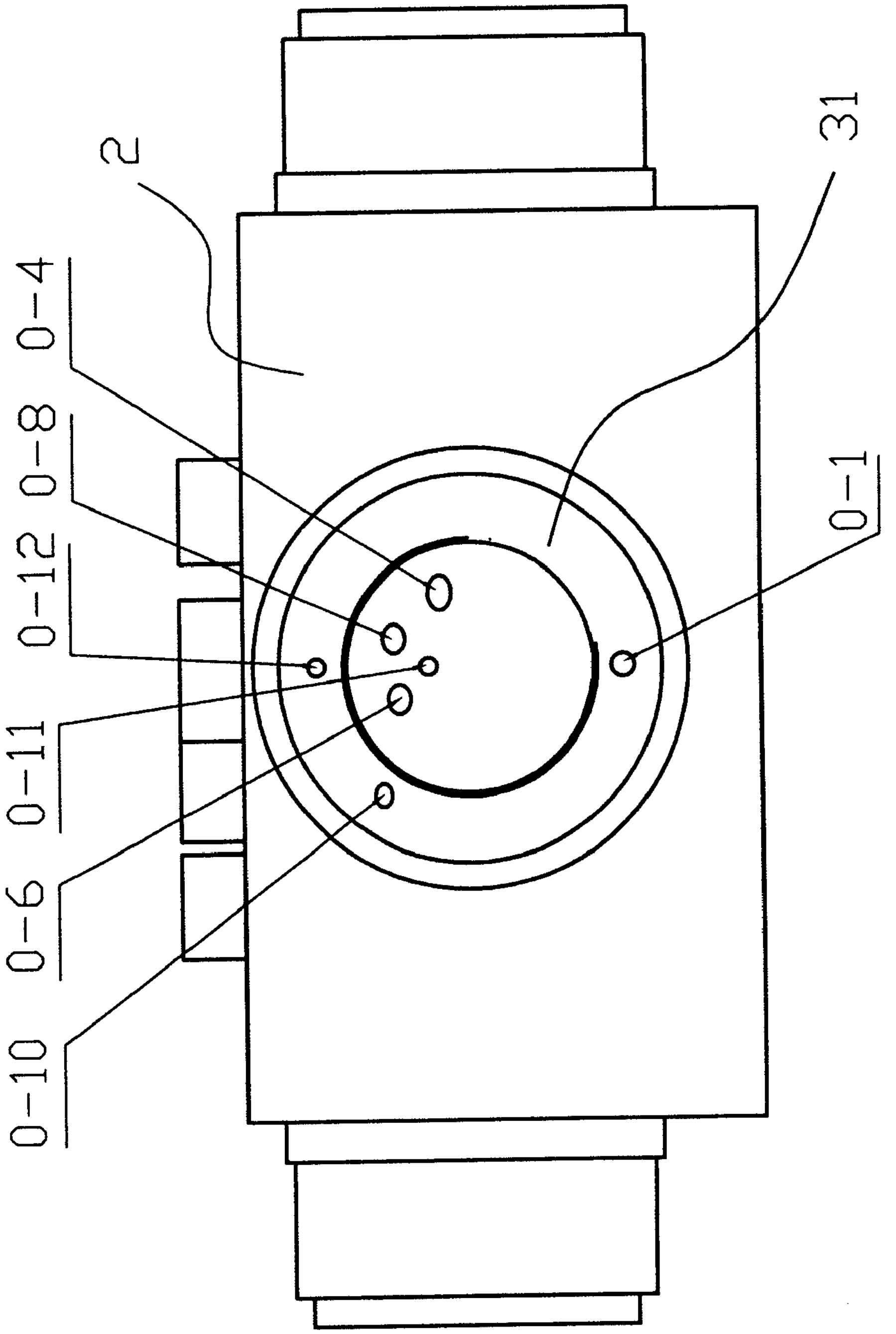
FIG. 7 is a plan view of the oil path distribution at the connection end of the valve bush combination according to the invention.

As shown in FIGS. 2 and 4 of this implementation example, the input cylinder B1 and the hydraulic speed regulation line can be set in a valve bush combination 3 via the valve plate 2. The output cylinder B4 is jacketed in the oil tank to form a jacket combination 4. This jacket combination 4 is connected to the valve bush combination 3 and sealed. As shown in FIG. 7, the oil outlets 0-4, 0-6, 0-8, and the oil inlet 0-1 in the valve bush combination are all set at the connection end 31 of the valve bush combination 3, and after connecting to the jacket combination 4, the oil outlets 0-4, 0-6, and 0-8 of the hydraulic sub-lines 11, 12 and 13 are connected to the output cylinder B4, and the oil inlet 0-1 connected to the oil tank.

As shown in FIGS. 4 and 5 of this implementation example, the unloading valve F5 and overflow valve F4 can be integrated into the valve bush combination 3 via the valve plate 2. Its outlet 0-11 and the inlets 0-12 and 0-10 are set at the connection end 31 of the valve bush combination 3, and after connecting to the jacket combination 4, the outlet 0-11 is connected to the output cylinder B4, and inlet 0-12 and 0-10 to the oil tank. As shown in FIGS. 1 and 3, all the hydraulic sub-lines 11, 12 and 13 in this implementation example share a single inlet path 0-1, which is connected to the oil tank. This inlet path 0-1 is connected to the oil tank 106 and the input cylinder B1 via the three one-way valves set inside the bush combination 3. The output cavity Y3 of the speed regulation cylinder B2 and the output cavity Y6 of the speed regulation cylinder B3 are used to add hydraulic oil during the cyclic working process. As shown in FIGS. 3 and 4, the three hydraulic sub-lines 11, 12 and 13, which are connected to the input cylinder B1, share a single oil path 0-2. The overflow valve F4, the oil path 0-9 of the input cylinder B1, the control valve F3 in the hydraulic sub-line 13 and the oil path 0-7 of the input cylinder B1, as show in FIG. 5 of this implementation example, are all set in the valve bush combination 3 via the valve plate 2.

As stated above in this implementation example, combination design method is adopted for the hydraulic sub-lines, the control valve and the input cylinder B1, which are integrated into a single valve bush combination 3 via the valve plate 2. The output cylinder 4 is jacketed in the oil tank to form the jacket combination 4 and the valve bush combination 3 is connected to the jacket combination 4, which forms the basic structure of the jack in this invention. Additionally, it adopts the combination design method for the several oil paths. All of these designs simplify the manufacture process, reduce the production cost of the device and feature this invention with advantages of compact structure and small size.

Second Embodiment

The speed regulation method in the second embodiment is the same as that in the first embodiment, and thus not mentioned again.

Figure 8:
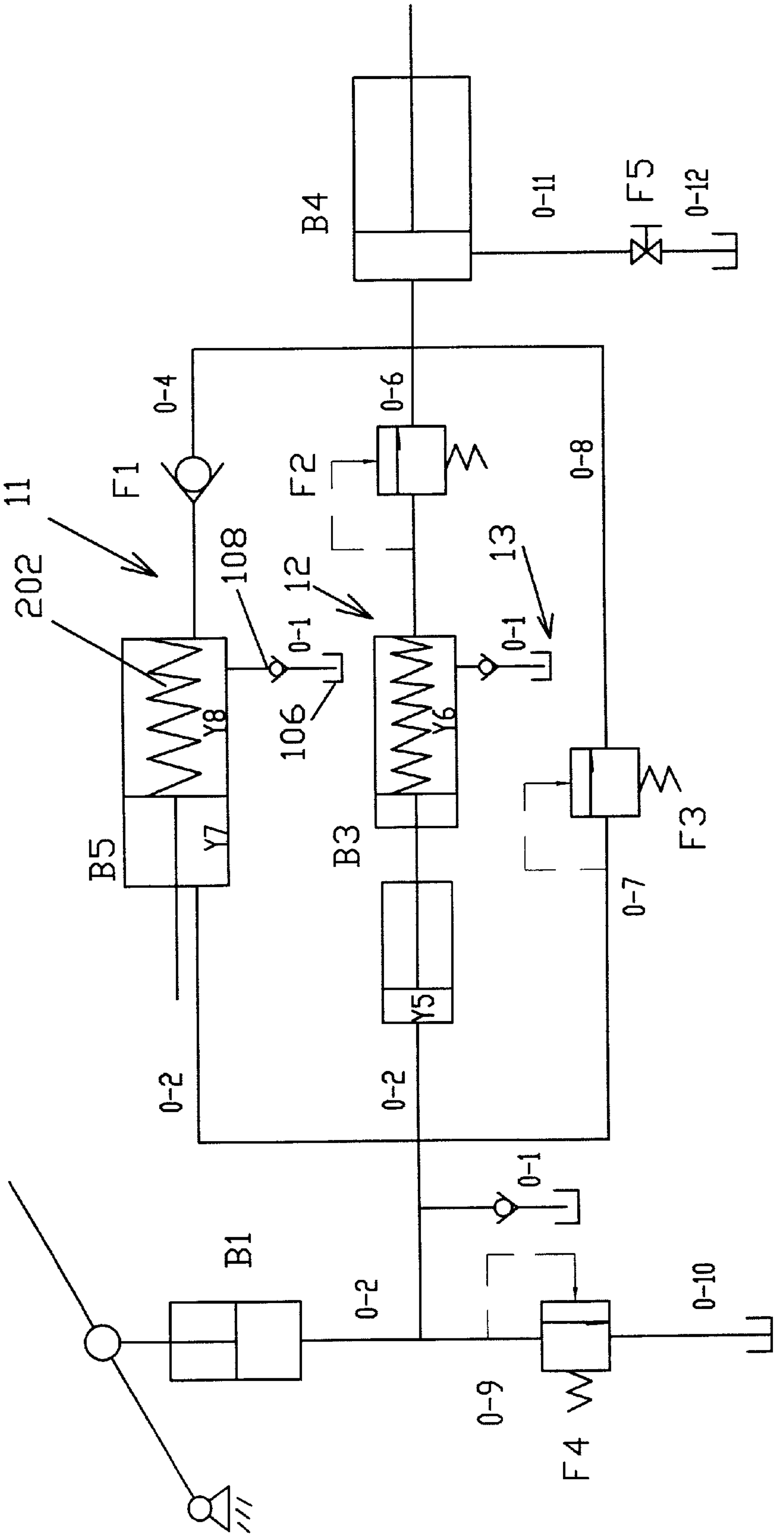
FIG. 8 is a schematic block diagram of multilevel speed regulation jack according to a second embodiment (Example 2)

As shown in FIG. 8, the differences between this embodiment and the first embodiment are that in this example, the speed regulation cylinder in the hydraulic sub-line is made up of a single-level cylinder B5, its piston rod extends out of the input cavity Y7, and the ring type pressurized surface of the input cavity Y7 is less than the thrusting surface of the output cavity Y8, thus an area difference is obtained to change the working speed of the hydraulic sub-line.

In this implementation example, a flexible restoring mechanism is also set in the speed regulation cylinder, and this flexible restoring mechanism can be made from spring 202 in practice with its one end fixed on the speed regulation cylinder and the other connected to the piston. Initially, the spring is in its free state, and the output cavity Y8 of the speed regulation B5 is fully filled with hydraulic oil. When the piston of the input cylinder B1 is pressed, the pumped hydraulic oil pushes the piston to move and at the same time compresses or stretches the spring 202. Thus the hydraulic oil in the output cavity Y8 is pumped to the output cylinder B4, which pushes its piston to lift the load. The output cavity Y8 of the speed regulation cylinder B5 is connected to the oil tank 106 via a one-way valve 108. When the input cylinder is raised, the spring 202 brings along the piston of the speed regulation cylinder B5 to its original position, the volume of the output cavity becomes larger, and as a result, the hydraulic oil in the oil tank 106 goes up and opens the one-way valve 108 to add into the output cavity Y8, being ready for the next action.

In this implementation example, the speed level of each of the hydraulic sub-lines 11, 12, 13 and their combination can be determined by setting the area difference between the ring-type piston thrusting surface of the input cavity Y7 and the larger piston thrusting surface of the output cavity Y8 of the speed regulation cylinder B5 in the hydraulic sub-line 11.

Since the speed regulation method and the basic structure of this implementation example are the same as those of the first embodiment, this implementation example enjoys the same beneficial effects.

Third Embodiment

Figure 9:
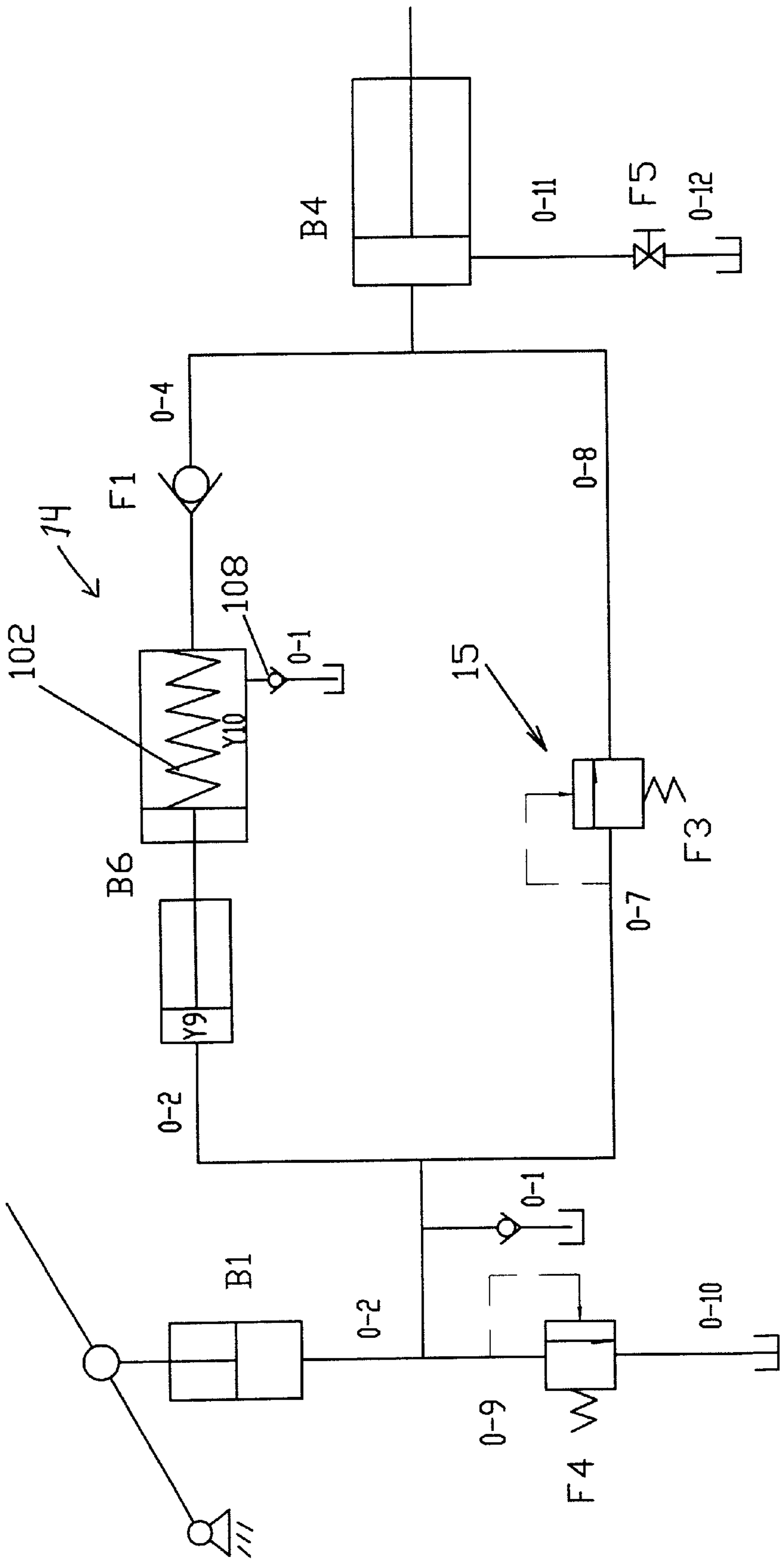
FIG. 9 is a schematic block diagram of multilevel speed regulation jack according to a third embodiment (Example 3).

When the load does not change in a wide range to which the jack in this invention is used, use of a jack in this invention with fewer speed levels can also achieve the purpose of increasing work efficiency. As shown in FIG. 9 of this implementation example, the hydraulic speed regulation line connected in series between the input cylinder B1 and output cylinder B2 can be made up of two hydraulic sub-lines 14 and 15. These two hydraulic sub-lines and their combination have three speed levels, its speed regulation process comprises at least one of the following steps:

(1) In the case of an idle load, when the piston of the input cylinder B1 is pressed, the control valve F1 of the hydraulic sub-line 14 with the highest speed level and the minimum opening pressure opens, the hydraulic oil is pumped to the input cavity Y9 of the speed regulation cylinder B6, and its piston forces the hydraulic oil in the output cavity Y10 to flow into the output cylinder B4, thus driving the piston of the output cylinder B4 to lift load at the first speed $V_1$; at the end of a lift, when the piston of the input cylinder B1 is raised, the piston of the speed regulation cylinder B6 returns to its original position under the forces of the flexible restoring mechanism (spring 102), and the hydraulic oil goes up and opens the one-way valve 108 and adds into the output cavity of the speed regulation cylinder B6, and once again, the piston of the input cylinder is pressed, the above process repeats.

(2) In the case of an increased load, the control valve F3 of the hydraulic sub-line 15 at a lower speed level opens, part of the hydraulic oil will be directly pumped into the output cylinder B4, so the piston of the output cylinder B4 lifts the load at the second speed $V_2$.

(3) In the case of a load that is larger than a specific value, the back pressure thus produced forces the control valve of the high-speed hydraulic sub-line 14 to close. The hydraulic oil pumped by the input cylinder B1 is completely pumped into the output cylinder B4 of the hydraulic sub-line 15 at the low-speed level, thus driving the piston of the output cylinder to lift load at the third speed $V_3$.

In this embodiment, the structure of the speed regulation cylinder B6 in the hydraulic sub-line 14 can either adopt the two-level example as described and shown in FIG. 9 or the single-level example as described in connection with the second embodiment.

The basic structure, working principles and effects of the implementation example are the same as those in the implementation example 1, and thus will not be mentioned again.

The above implementation examples and embodiments are only several specific implementations, and intended only to demonstrate this invention rather than restrict this invention. For example, the hydraulic sub-lines of this invention can be set for four, five or even more, and thus the speed levels corresponding to these hydraulic sub-lines and their combination will be 7, 9 or even more. However, their speed regulation and the basic structure are the same as those in the above examples.

The multilevel speed regulation method and the multilevel speed regulation jack in this invention can also be used to the hydraulic elevating platforms based on a jack or other hydraulic machines which are used to convey power on the basis of changes of the liquid pressure.

While this invention has been particularly shown and described with references to preferred embodiments thereof, it will be understood by those skilled in the art that various changes in form and details may be made therein without departing from the scope of the invention encompassed by the appended claims.

What is claimed is:

1. A multilevel speed regulation system for a jack, comprising:

a hydraulic speed regulation line between input and output cylinders, the hydraulic speed regulation line comprising at least two parallel hydraulic sub-lines providing at least three speed levels in which the pressure which is applied by the output cylinder against a load is used as a control signal to control opening and closure of the hydraulic sub-lines at the speed levels.

2. The multilevel speed regulation system for a jack of claim 1, wherein the hydraulic speed regulation line is comprised of three or more parallel hydraulic sub-lines.

3. The multilevel speed regulation system for a jack of claim 1, wherein control valves are set in the hydraulic sub-lines, which take the pressure as the control signal to control opening and closure.

4. The multilevel speed regulation system for a jack of claim 3, wherein the opening pressure of the control valves in the hydraulic sub-lines is set in sequence, and opens and closes in sequence with the increase of the load.

5. The multilevel speed regulation system for a jack of claim 4, wherein a speed regulation cylinder is provided in at least two of the hydraulic sub-lines, and with the changes to the difference between the speed regulation cylinder input cavity and an area of the input cavity piston on the various hydraulic sub-lines, the various hydraulic sub-lines or their combination is featured by different speed levels.

6. The multilevel speed regulation method for a jack of claim 5, wherein a flexible restoring mechanism is set in the speed regulation cylinder, the output cavity of this speed regulation cylinder is connected to an oil tank via a one-way valve.

7. The multilevel speed regulation method for a jack of claim 6, wherein the combination of the hydraulic sub-lines consists of two hydraulic sub-lines.

8. The multilevel speed regulation method for a jack of claim 1, wherein the hydraulic sub-line at the lowest speed level of the hydraulic speed regulation line is directly connected to the input and output cylinders via a control valve.

9. The multilevel speed regulation system for a jack of claim 8, wherein the hydraulic speed regulation line with three speed levels comprises two hydraulic sub-lines and has a speed regulation process including at least one of the following steps:

in the case of an idle load, when a piston of the input cylinder is pressed, the control valve of the hydraulic sub-line with a minimum opening pressure and a highest speed level opens, hydraulic oil is pumped to an input cavity of a speed regulation cylinder, and its piston forces the hydraulic oil in an output cavity to flow into the output cylinder, thus driving a piston of the output cylinder to lift the load at the first speed $V_1$; at the end of a lift, when the piston of the input cylinder is raised, the piston of the speed regulation cylinder returns to its original position under the forces of a flexible restoring mechanism, and the hydraulic oil goes up and opens a one-way valve and adds into the output cavity of the speed regulation cylinder;

in the case of an increased load, a control valve of a hydraulic sub-line at a lower speed level opens, part of the hydraulic oil is directly pumped to the output cylinder to drive the piston of the output cylinder to lift the load at the second speed $V_2$; and in the case of a load which is larger than a specific value, back pressure forces a control valve of a high-speed hydraulic sub-line to close, the hydraulic oil pumped by the output cylinder is pumped into the output cylinder in the hydraulic sub-line at the low-speed level, thus driving the piston of the output cylinder to lift load at the third speed $V_3$.

10. The multilevel speed regulation method for a jack of claim 8, wherein the hydraulic speed regulation line has three hydraulic sub-lines providing five speed levels.

11. As a multilevel speed regulation jack, comprising:

at least one input cylinder and one output cylinder;

a speed regulation line having at least three speed levels and including at least two parallel hydraulic sub-lines that take the load pressure of the output cylinder as a control signal to control an opening and closure of the hydraulic sub-lines at different speed levels.

12. The multilevel speed regulation jack of claim 11, wherein the hydraulic speed regulation line comprises three or more parallel hydraulic sub-lines.

13. The multilevel speed regulation jack of claim 11, wherein a control valve is set up in the hydraulic sub-lines, the opening and closure of which is controlled by the control signal.

14. The multilevel speed regulation jack of claim 13, wherein the opening pressure of the control valves in the hydraulic sub-lines is set to open in sequence with the increase of the load.

15. The multilevel speed regulation jack of claim 14, wherein the control valve in the hydraulic sub-lines can be either a one-way valve or a sequential valve.

16. The multilevel speed regulation jack of claim 11, wherein the hydraulic sub-line with the lowest speed level in the hydraulic speed regulation line is directly connected to the input and output cylinders via a control valve.

17. The multilevel speed regulation jack of claim 11, wherein a speed regulation cylinder is set in the said hydraulic sub-lines and a difference between piston areas of input and output cavities in the hydraulic sub-lines are set in sequence.

18. The multilevel speed regulation jack of claim 17, wherein a flexible restoring mechanism is set in the speed regulation cylinder and the output cavity of this speed regulation cylinder is connected to an oil tank via a one-way valve.

19. The multilevel speed regulation jack of claim 18, wherein the speed regulation cylinder comprises oil cylinders of two different levels, the sectional area of the first-level cylinder is less than that of a second-level cylinder, and a first-level piston and a second-level piston are connected via a piston rod.

20. The multilevel speed regulation jack of claim 18, wherein the speed regulation cylinder comprises a single-level oil cylinder and its piston rod extends out of an input cavity.

21. The multilevel speed regulation jack of claim 11, wherein the input cylinder and hydraulic speed regulation line are set in a valve bush combination, an output oil cylinder jacket is set in an oil tank, and a cylinder jacket combination is sealed and connected to the valve bush combination.

22. The multilevel speed regulation jack of claim 21, wherein the hydraulic sub-lines jointly make use of one oil suction loop which is connected to the oil tank.

23. The multilevel speed regulation method for a jack of claim 21, wherein the various hydraulic sub-lines connected to the input oil tank jointly use one interconnected oil path.

* * * * *